(No Model.)

J. C. HENRY.
MOTOR GENERATOR.

No. 512,820. Patented Jan. 16, 1894.

WITNESSES:
William Goebel
Clarence Prior

INVENTOR
John C. Henry
BY Knight & Bros
ATTORNEYS.

UNITED STATES PATENT OFFICE.

JOHN C. HENRY, OF WESTFIELD, NEW JERSEY.

MOTOR-GENERATOR.

SPECIFICATION forming part of Letters Patent No. 512,820, dated January 16, 1894.

Original application filed April 29, 1892, Serial No, 431,205. Divided and this application filed December 29, 1892. Serial No. 456,725. (No model.)

*To all whom it may concern:*

Be it known that I, JOHN C. HENRY, a citizen of the United States, residing at Westfield, county of Union, State of New Jersey, have invented certain new and useful Improvements in Motor-Generators, of which the following is a specification.

The invention relates to a motor generator of simple and compact construction in which a number of the bearings ordinarily used are done away with, the armatures of both motor and generator part of the machine are balanced on a single, central support and both armatures are excited by one field. The especial compactness and solidity of my present construction add to the motor-generator's most important qualification, to wit, its capacity as a "self contained" machine for operation at a very high speed. In the form of electric railways described in my application, Serial No. 431,205, filed April 29, 1892, (of which the present application is a division,) where a single motor-generator is employed to supply current to a number of car-motors, it is desirable that the weight of the motor-generator be reduced to the lowest possible limit and in order to secure from the motor-generator the electro-motive force necessary for a number of motors without increasing its weight, it is necessary to propel the motor-generator at a high velocity—whence follows the necessity for strong, simple and compact construction.

Figure 1:
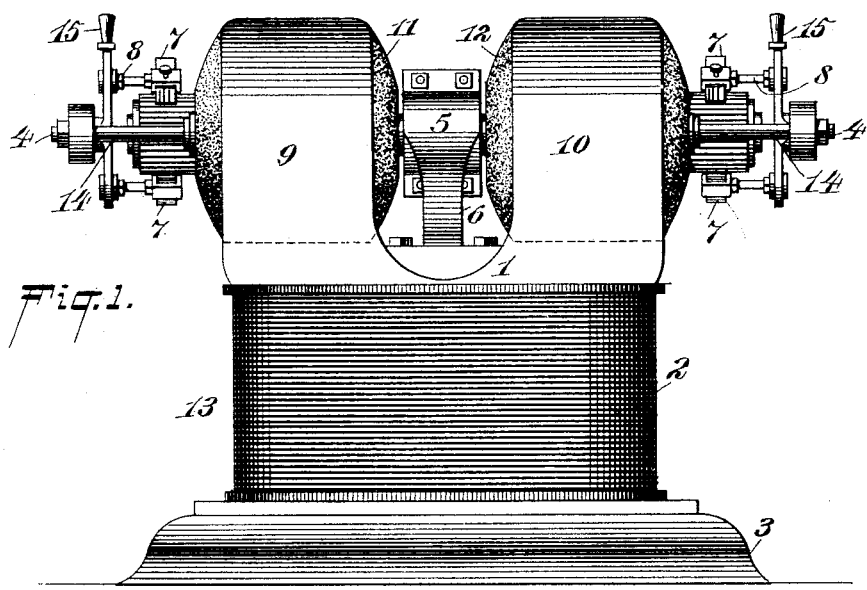
Figure 2:
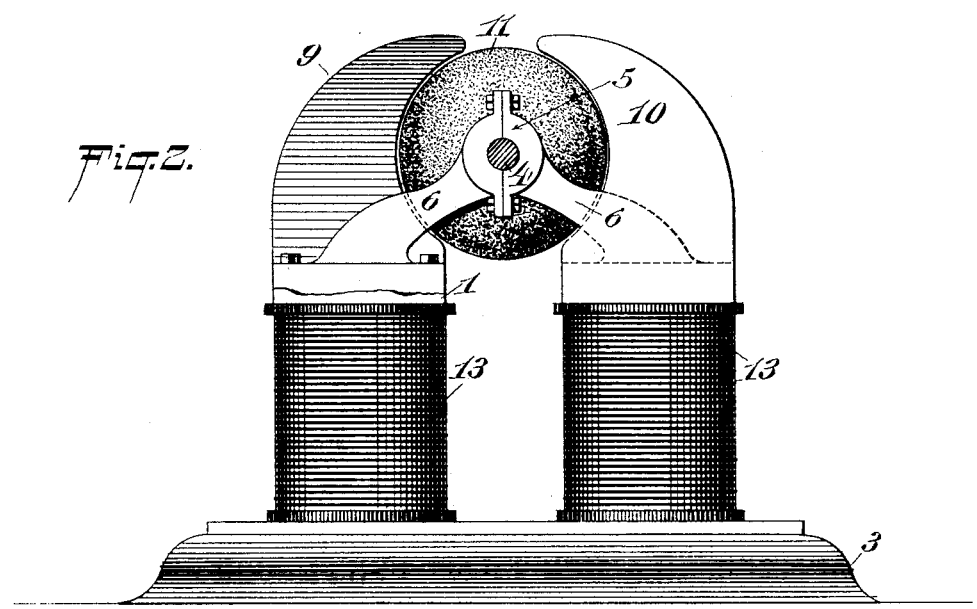

Referring to the accompanying drawings which form a part of this specification:—Figure 1 is a side elevation, and Fig. 2 an end elevation (with one motor-pole-piece broken away) of the motor generator.

3 is the base of the machine. Mounted on the base are two upright parallel field-magnets 13, 13, the parts of whose cores 1 projecting above the coils 2 are bifurcated as shown in Fig. 1 to form pole pieces 9 for the motor and pole pieces 10 for the generator part of the machine. The poles of both motor and generator on each side of the machine have thus a common field-magnet core and coil and are projections from a single field magnet. The interior contour of the pole pieces is shown in Fig. 2. They embrace respectively the armature 11 of the motor and the armature 12 of the generator driven by said motor. The two armatures 11, 12 have a common shaft 4 which is mounted in a bearing 5 carried by supporting arms or brackets 6 mounted on the field-magnet cores between the pole-pieces. The armature shaft 4 has no end supports. The commutator brushes 7 and their supports 8 are carried by brackets 14 projecting from the pole pieces 9, 10. Handles 15 are carried by brush-supports 8, 8 for shifting the brushes. If the field-magnets are wound in shunt with the motor-armature, and a practically constant speed of the generator armature thus assured, the electro-motive force and quantity of current supplied by the generator can both be readily regulated by shifting the brushes of the generator.

Having thus described my invention, the following is what I claim as new therein and desire to secure by Letters Patent:

1. In a magneto-electric machine the combination of suitable field-magnets, two armatures carried by a single shaft and a single support for said shaft, between the armatures, substantially as set forth.

2. In a motor-generator, the combination of two armatures, and field-magnets common to both armatures, wound with a common coil and having separate pole-pieces for each armature, substantially as set forth.

3. In a motor generator the combination of the pair of armatures 11, 12 the motor field magnets having common windings 13 and separate pole pieces 9, 10, and a bearing for the armature shafts between the armatures and supported on the field magnets.

JOHN C. HENRY.

Witnesses:
SUSIE A. HENRY,
HARRY E. KNIGHT.